United States Patent [19]

Hauck

[11] Patent Number: 5,700,510
[45] Date of Patent: Dec. 23, 1997

[54] PRESSURE-CONTROLLED DIE APPARATUS FOR THE PRODUCTION OF EXTRUSION-COOKED AQUATIC FEEDS

[75] Inventor: Bobbie W. Hauck, Sabetha, Kans.

[73] Assignee: Wenger Manufacturing Inc., Sabetha, Kans.

[21] Appl. No.: 683,191

[22] Filed: Jul. 18, 1996

[51] Int. Cl.$^6$ .............................. A23P 1/00; B29C 47/00
[52] U.S. Cl. ............... 426/516; 264/40.5; 264/211.21; 425/113; 425/131.1; 425/133.1; 425/149; 425/376.1; 426/448
[58] Field of Search .................... 426/516, 448, 426/805; 425/113, 131.1, 133.1, 149, 376.1; 264/40.5, 211.21

[56] References Cited

U.S. PATENT DOCUMENTS

| | | | |
|---|---|---|---|
| 4,161,380 | 7/1979 | Bishop | 425/149 |
| 4,632,795 | 12/1986 | Huber et al. | 264/40.5 |
| 4,728,367 | 3/1988 | Huber et al. | 425/145 |
| 5,114,488 | 5/1992 | Huber et al. | 425/376.1 |
| 5,620,713 | 4/1997 | Rasmussen | 426/516 |

*Primary Examiner*—George Yeung
*Attorney, Agent, or Firm*—Hovey, Williams, Timmons & Collins

[57] ABSTRACT

An extrusion die apparatus adapted for coupling to the outlet end of an extruder barrel and corresponding methods of use are described. The die apparatus, when so coupled to the extruder barrel, has 1) an inlet-end chamber downstream of and in communication with the interior of the extruder barrel, 2) a secondary chamber downstream of and in communication with the inlet-end chamber, and 3) a plurality of individual, spaced die-outlet orifices downstream of and in communication with the secondary chamber. The die apparatus includes manually or automatically controllable inserts for controlling the operating pressures within the chambers and outlet orifices. These operating pressures are adjusted so that the pressure within the inlet-end chamber, which controls cooking, is greater than the pressure within the secondary chamber, and the pressure within the secondary chamber is greater than the pressure within each outlet orifice. In operation, the die apparatus receives product from the extruder barrel. The product is sequentially and continuously passed through the inlet-end chamber, the secondary chamber, and the outlet orifices, and is thereby subjected to a specific operating pressure within each chamber or outlet orifice. The pressures within the outlet orifices are individually adjusted so that the velocities of the final extrudate exiting the die apparatus are substantially the same. This final extrudate is cut by a knife as it emerges from the extruder barrel into pellets having consistent lengths.

18 Claims, 1 Drawing Sheet

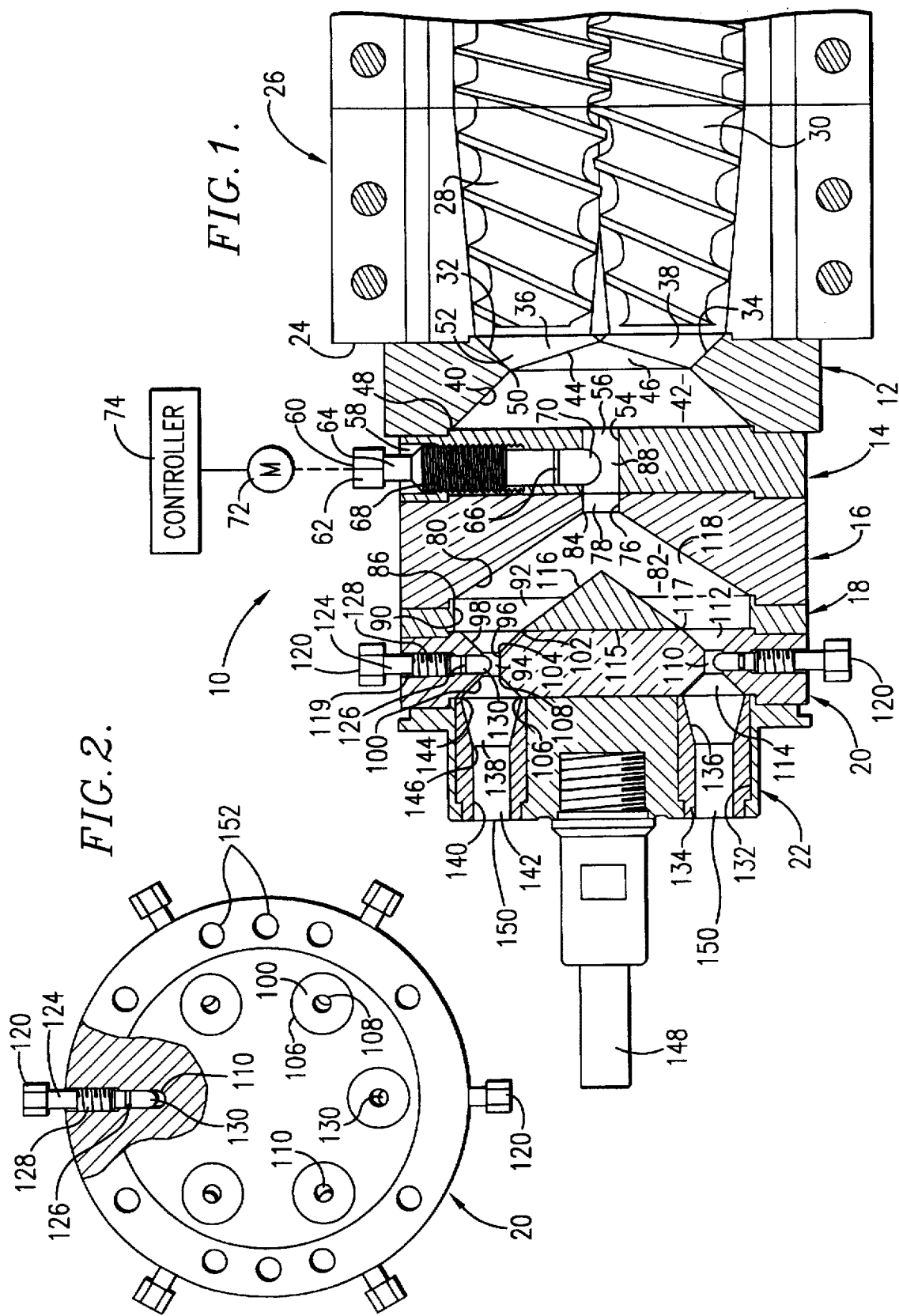

PRESSURE-CONTROLLED DIE APPARATUS FOR THE PRODUCTION OF EXTRUSION-COOKED AQUATIC FEEDS

BACKGROUND OF THE INVENTION

1. Field of the Invention

The present invention is broadly concerned with a die apparatus adapted for coupling to the outlet end of an extruder barrel which shapes a product passing through the barrel into a final extrudate, and corresponding methods of use. More particularly, the present invention is concerned with a die apparatus having an inlet-end chamber, a secondary chamber, and a plurality of die-outlet orifices which are interconnected and serially arranged, wherein the product is subjected to specific, different operating pressures; the die apparatus includes means for regulating the operating pressure within the inlet-end chamber to control cooking, and means for individually regulating the operating pressures within the die-outlet orifices such that the velocities of the final extrudate leaving the die-outlet orifices are substantially identical, resulting in product pellets having consistent lengths.

2. Description of the Prior Art

Extrusion equipment has commonly been used for the preparation of human and animal feed stuffs. For example, large extruders have been used for many years for the production of dry chunk-type dog foods. Generally speaking, such equipment includes an extruder having an elongated, tubular barrel with one or two elongated, helically flighted, axially rotatable screws therein. A multiple-orifice die is normally attached to the outlet end of the extruder barrel and is the prime means for shaping and final cooking of the extrudate.

The simplest die apparatus in the form of a simple plate having a plurality of outlet openings therethrough. More sophisticated dies have also been proposed, such as pressure-controlled dies and those having orifices of variable effective dimensions.

Normally, when small diameter products are being extruded, the conventional dies are entirely adequate. When large diameter products (e.g., from 18–40 mm or larger) are desired, the conventional dies are sometimes deficient, in that differential pressures are created at the respective outlet openings. This results in uneven flow through the die and the creation of extrudates having different lengths. This is undesirable in many cases, given the need to prepare uniform-sized extrudates.

SUMMARY OF THE INVENTION

The present invention is directed to an extrusion die apparatus and corresponding methods of use. The die apparatus is adapted for coupling to the outlet end of an extruder (either a single or twin screw extruder is applicable). In operation, the die apparatus receives a product from the extruder barrel and shapes it into a final extrudate which is cut by a knife into pellets having consistent lengths. Preferably, the final extrudate is a cylindrical food pellet (e.g., aquatic feed) having a diameter of from 18 mm to 40 mm.

The die apparatus contains an inlet-end chamber which, when the die apparatus is coupled to the extruder barrel, is downstream of and in direct communication with the interior of the extruder barrel. Additionally, the die apparatus includes a secondary chamber downstream of the inlet-end chamber. A first passageway communicates the inlet-end chamber with the secondary chamber. The die apparatus also contains a plurality of individual, spaced die-outlet orifices downstream of the secondary chamber. A second passageway communicates the secondary chamber with each outlet orifice.

The die apparatus also has means for controlling the operating pressures within the inlet-end chamber, the secondary chamber, and the outlet orifices. These operating pressures are adjusted so that the pressure within the inlet-end chamber is greater than the pressure within the secondary chamber, and the pressure within the secondary chamber is greater than the pressure within each outlet orifice.

In particularly preferred forms, the outlet orifices are circumferentially arranged and spaced, and a conical bullet located within the secondary chamber directs the flow of the product from the secondary chamber to each of the second passageways. The die apparatus also includes structure for adjusting the operating pressures within the chambers and outlet orifices. This structure includes an adjustable screw having one end extending into the first passageway; this screw, which may be adjusted manually or connected to an automated controller, adjusts the pressure within the inlet-end chamber. The pressure-adjusting structure also includes a plurality of screws, wherein one end of each extends into a corresponding second passageway; each of these screws controls the pressure within a corresponding outlet orifice.

A product leaving the outlet end of an extruder barrel is sequentially and continuously passed through the inlet-end chamber, the secondary chamber, and the outlet orifices. The product is thereby subjected to a specific operating pressure within each chamber or outlet orifice. In preferred embodiments, the magnitude of the pressure within the inlet-end chamber is greater than 20 psig, and ideally is from 250 to 300 psig, while the magnitude of the pressure within the secondary chamber is greater than 10 psig, and ideally is from 10 to 250 psig. The pressure within the inlet-end chamber controls cooking of the product. The pressures within the outlet orifices are individually adjusted so that the velocities of the final extrudate exiting the die apparatus are substantially the same; this results in the final pellets having uniform lengths.

BRIEF DESCRIPTION OF THE DRAWINGS

FIG. 1 is a fragmentary, partially schematic horizontal sectional view of the die apparatus in accordance with the present invention mounted onto the outlet end of an extruder barrel; and FIG. 2 is an end view of the valve plate of the die apparatus depicted in FIG. 1, with a section broken away to reveal one of the valve assemblies.

DETAILED DESCRIPTION OF THE PREFERRED EMBODIMENT

1. The Die Apparatus.

Turning now to the drawings, die apparatus 10 is illustrated in FIG. 1. Die apparatus 10 is composed of six axially aligned, generally annular blocks arranged in a face-to-face relationship, namely inlet-end block 12, throttle block 14, secondary block 16, ring block 18, valve block 20, and insert flange block 22. Die apparatus 10 is attached to outlet end 24 of twin screw extruder barrel 26 containing a pair of flighted, axially rotatable auger screws 28 and 30.

Inlet-end block 12 is directly coupled to outlet end 24. Block 12 presents a pair of adjacent cylindrical surfaces 32 and 34 providing a pair of cylindrical cavities 36 and 38, respectively. Block 12 also presents frustoconical surface 40 providing frustoconical cavity 42, and conical surface 44 providing conical cavity 46. Conical surface 44 is interposed between and is contiguous with cylindrical surfaces 32 and 34, and frustoconical surface 40. Cylindrical surfaces 32 and 34 extend from the face of block 12 adjacent outlet end 24 to conical surface 44. Frustoconical surface 40 extends from its large circumference end 48 located at the face of block 12 adjacent throttle block 14, to its small circumference end 50, which is also the circumference of conical surface 44. Cavities 36, 38, 42, and 46 are in communication with each other and define inlet-end chamber 52.

Throttle block 14 is directly coupled to block 12. Block 14 presents cylindrical surface 54 extending through block 14 and providing cylindrical cavity 56. Block 14 includes threaded bore 58 extending radially within block 14 from the external surface thereof to and in communication with cylindrical cavity 56. Bore 58 receives axially rotatable throttle stem 60 including head 62 and shank 64. Shank 64 is externally threaded for receipt within bore 58. Sealing means are provided by O-ring 66 located on shank 64 below threads 68. Rounded end 70 of shank 64 protrudes into cylindrical cavity 56. Servomotor 72 is connected to both throttle stem 60 and controller 74.

Secondary block 16 is directly coupled to block 14. Block 16 presents cylindrical surface 76 providing cylindrical cavity 78, and frustoconical surface 80 providing frustoconical cavity 82. Cylindrical surface 76 extends from the face of block 16 adjacent block 14 to circumference 84. Frustoconical surface 80 extends from its large circumference end 86, located at the face of block 16 adjacent ring block 18, to its small circumference end 84. Cylindrical cavities 56 and 78 are in communication with each other and define first passageway 88.

Ring block 18 is directly coupled to and interposed between block 16 and valve block 20. Block 18 presents cylindrical surface 90 providing cylindrical cavity 92. Block 20 provides six circumferentially arranged valve block chambers 94. Each chamber 94 is provided by a cylindrical surface 96 interposed between and contiguous with a pair of opposed frustoconical surfaces 98 and 100. Frustoconical surface 98 extends from its large circumference end 102, located at the face of block 20 adjacent block 18, to its small circumference end 104. Frustoconical surface 100 extends from its large circumference end 106, located at the face of block 20 adjacent block 22, to its small circumference end 108. Circumferences 104 and 108 define the ends of cylindrical surface 96. Cylindrical surface 96 provides second passageway 110, while frustoconical surfaces 98 and 100 provide frustoconical cavities 112 and 114, respectively. Base 115 of conical flow-directing bullet 116 is axially attached to the face of block 20 adjacent block 18. Circumference 117 of bullet 116 is tangential to large circumference end 102 of frustoconical surface 98.

Second passageway 110 and frustoconical cavities 112 and 114 are in communication with each other and define valve block chamber 94. Cavities 82, 92, and 112 are in communication with each other and define secondary chamber 118. First passageway 88 provides means for communication between inlet-end chamber 52 and secondary chamber 118.

Block 20 includes six circumferentially arranged threaded bores 119. Each bore 119 extends radially within block 20 from the external surface thereof to and in communication with a second passageway 110. Each bore 119 receives an axially rotatable valve stem 120 including an enlarged head and shank 124. Shank 124 is externally threaded for receipt within bore 119. Sealing means is provided by O-ring 126 located on shank 124 below threads 128. Rounded end 130 of shank 124 protrudes into second passageway 110.

Flange block 22 is directly coupled to block 20. Block 22 includes six circumferentially arranged bores 132 extending axially through block 22. Each bore 132 receives a cylindrical insert 134. Each insert 134 presents frustoconical surface 136 providing frustoconical cavity 138, and cylindrical surface 140 providing cylindrical cavity 142. Frustoconical surface 136 extends from its large circumference end 144 to its small circumference end 146. Large circumference end 144 is located at the face of insert 134 adjacent block 20, and is adjacent large circumference end 106 of frustoconical surface 100. Cylindrical surface 140 extends from the uncoupled face of block 22 to circumference 146. Additionally, knife mount 148 is attached to the uncoupled face of block 22. Cavities 114, 138, and 142 are in communication with each other and define die-outlet orifice 150. Second passageways 110 provide means for communication between secondary chamber 118 and die-outlet orifices 150. All inner surfaces of blocks 12–20, cylindrical inserts 134, and extruder barrel 26 are contiguous with each other, and all cavities provided by these surfaces are in communication with each other.

Means for coupling blocks 12–22 to each other and to outlet end 24 of extruder barrel 26 are provided by a plurality of circumferentially arranged bores. Ten bores are located near the external surface of, axially extend through, and are identically positioned in each of blocks 12–22 (e.g., bores 152 of block 20 illustrated in FIG. 2; bores for blocks 12–18 and 22 not shown). Extruder barrel 26 includes ten bores corresponding to the bores of blocks 12–22. When blocks 12–22 are coupled to extruder barrel 26 as illustrated in FIG. 1, identically positioned bores in blocks 12–22 and extruder barrel 26 are in alignment. Fastening bolts are passed into the aligned bores to securely hold die apparatus 10 onto outlet end 24.

2. Operation Of the Die Apparatus.

Generally, a product leaving outlet end 24 of extruder barrel 26 is sequentially and continuously passed through successive chambers of die apparatus 10 to produce a final extrudate. Specifically, the product leaving outlet end 24 enters inlet-end chamber 52, where it is subjected to operating pressure P1. The product then passes through first passageway 88 to secondary chamber 118, where it is subjected to operating pressure P2. Next, the product is directed through six second passageways 110 by flow-directing bullet 116 to six die-outlet orifices 150, where it is subjected in each outlet orifice 150 to operating pressure P3. P1, P2, and P3 are independent of each other, and are individually adjusted such that P1 is greater than P2, and P2 is greater than P3. Means for controlling P1, P2, and P3 are provided by die apparatus 10. Finally, the final extrudate exits die apparatus 10 from outlet orifices 150, and is cut by a knife (not shown) attached to and rotating about knife mount 148. The final product emerges as cylindrical pellets. For aquatic feed, these pellets have a diameter between 18 mm and 40 mm. However, die apparatus 10 is not limited to processing aquatic feed, nor is the diameter of the pellets limited to below 40 mm.

P1 imparts upon the product in inlet-end chamber 52 the pressure required for cooking. The preferred magnitude of P1 is between 250 psig and 300 psig. Where the product is aquatic feed, product quality deteriorates when P1 is outside of this operating range (product quality is defined as firmness, pellet durability, pellet shape, sink rate, surface appearance, fat adsorption, and squareness of cut by the extruder knife). However, the optimal magnitude for P1 depends upon the nature of the product being extruded. Starch level, type of starch, proteinn quality, and fat content of the product all have an influence on the optimal operating range of P1. Some products may require that P1 be as high as 3000 psig to achieve a desired product quality. Furthermore, the optimal range of P1 depends upon the quality of the raw materials used. For example, it has been found that raw materials from the United States have a wider optimal P1 range than do raw materials from Japan.

P1 is controlled by axially rotatable throttle stem 60. Since throttle stem 60 and bore 58 are complementally threaded, rotation of throttle stem 60 is translated into the linear movement of rounded end 70 of throttle stem 60 within first passageway 88. Rotation of throttle stem 60 in one direction increases the degree of protrusion of rounded end 70 into first passageway 88, while rotation in the opposite direction decreases the degree of protrusion. This degree of protrusion determines the minimum width of first passageway 88, which in turn determines the back pressure (i.e., P1) exerted on the product in inlet-end chamber 52. The minimum width of first passageway 88 is inversely proportional to P1.

Throttle stem 60 is positioned periodically during the operation of die apparatus 10 to maintain an optimal P1. Preferably, rotation of throttle stem 60 is controlled by attached servomotor 72, and P1 is measured by a conventional pressure transducer (not shown) which is operably coupled to controller 74. If the pressure transducer senses a change in P1, it sends a signal to servomotor 72 which then correspondingly adjusts the position of throttle stem 60. Alternatively, rotation of throttle stem 60 is accomplished manually using a wrench, in which case the operator monitors P1 using a conventional manometer; if this method is employed, the throttle stem 60 is immobilized using a lock nut after adjustment.

P2 is the pressure required to push the product from secondary chamber 118 through outlet orifices 150. The magnitude of P2 is very low relative to usual cooking extruder standards. The preferred magnitude of P2 is between 10 psig and 250 psig, but can be over 250 psig in some applications. The magnitude of P2 is dependent upon the formulation of the product and the diameter of outlet orifices 150. P2 controls the velocity of the final extrudate leaving outlet orifices 150. Since the rotational velocity of the knife attached to knife mount 148 is constant, the velocity of the final extrudate determines the length of the pellets.

However, restrictions in the flow of product through outlet orifices 150 are not identical due to small differences in the diameters thereof. These differences result in nonuniform P3 magnitudes within outlet orifices 150. Consequently, if there were no means to individually adjust the P3 magnitudes, the velocities of the final extrudate exiting outlet orifices 150 also would be nonuniform, which would result in pellets of varying lengths. Thus, valve block 20 is included in die apparatus 10 to provide means for controlling each P3 magnitude such that the final extrudate exits outlet orifices 150 at identical velocities, resulting in consistent pellet lengths.

The means for adjusting each P3 are similar to the means for adjusting P2. Each P3 is controlled by an axially rotatable valve stem 120. Valve block 20 includes six valve stems 120, each one corresponding to an outlet orifice 150. Since valve stem 120 and bore 119 are complementally threaded, rotation of valve stem 120 is translated into the linear movement of rounded end 130 of valve stem 120 within second passageway 110. Rotation of valve stem 120 in one direction increases the degree of protrusion of rounded end 130 into second passageway 110, while rotation in the opposite direction decreases the degree of protrusion. This degree of protrusion determines the minimum width of second passageway 110, which in turn determines the pressure (i.e., P3) exerted on the product in outlet orifice 150.

Valve stems 120 are set as follows: Initially, they are fully retracted from their corresponding second passageways 110. The extrusion process is begun, and it is determined which outlet orifice 150 is discharging final extrudate at the lowest velocity (i.e., the slowest outlet orifice 150), and which is discharging final extrudate at the highest velocity (i.e., the fastest outlet orifice 150). Since the length of a pellet is directly proportional to the velocity of the final extrudate exiting outlet orifice 150, velocities are determined by measuring the lengths of the pellets. Valve stem 120 corresponding to the fastest outlet orifice 150 is then adjusted until the length of the pellet produced from this outlet orifice 150 is equal to the length of the pellet produced from the slowest outlet orifice 150.

Next, the fastest outlet orifice 150 is again determined, and its corresponding valve stem 120 is likewise adjusted until the length of the pellet produced from its outlet orifice 150 is equal to the length of the pellet produced from the slowest outlet orifice 150. This process is repeated until all of valve stems 120 have been adjusted, resulting in pellets having consistent lengths. Finally, each valve stem 120 is immobilized using a lock nut.

I claim:

1. Die apparatus adapted for coupling to the outlet end of an extruder barrel for receiving a product from the barrel and shaping the product into a final extrudate, said apparatus comprising:

a die body having an inlet-end chamber oriented for communication with the interior of said barrel, a secondary chamber downstream of said inlet-end chamber, and a plurality of individual, spaced die-outlet orifices downstream of said secondary chamber, first passageway-defining means extending between and communicating said inlet-end chamber and said secondary chamber, and second passageway-defining means extending between and communicating said secondary chamber and said outlet orifices; and pressure control means for maintaining operating pressures within said inlet-end chamber, said secondary chamber, and said outlet orifices at first, second, and third magnitudes, respectively, with said first magnitude being greater than said second magnitude, and said second magnitude being greater than said third magnitude.

2. The die apparatus of claim 1, wherein said outlet orifices are circumferentially spaced.

3. The die apparatus of claim 1 further comprising a conical bullet located within said secondary chamber that directs the flow of the product from said secondary chamber to a plurality of second passageways.

4. The die apparatus of claim 1, wherein said pressure control means includes structure for adjusting the magnitudes of the operating pressures.

5. The die apparatus of claim 1, wherein said pressure control means includes structure for adjusting the magnitude of the operating pressure within said inlet-end chamber.

6. The die apparatus of claim 5, wherein said structure includes an adjustable screw having one end extending into a first passageway.

7. The die apparatus of claim 6, wherein said screw is connected to an automated controller.

8. The die apparatus of claim 1, wherein said pressure control means includes structure for individually adjusting the magnitudes of the operating pressures within said outlet orifices respectively.

9. The die apparatus of claim 8, wherein said structure includes a plurality of screws, one end of each of said screws extending into a corresponding second passageway.

10. A method of extruding a product leaving the outlet end of an extruder barrel, said method comprising the steps of:

passing the product in successive order into and through an inlet-end chamber adjacent the outlet end, a secondary chamber downstream of said inlet-end chamber, and a plurality of individual, spaced die-outlet orifices downstream of the secondary chamber; and subjecting the product to first, second, and third magnitudes of operating pressures within the inlet-end chamber, secondary chamber, and die-outlet orifices respectively, with the first magnitude being greater than the second magnitude, and the second magnitude being greater than the third magnitude.

11. The method of claim 10, wherein the first magnitude is greater than 20 psig.

12. The method of claim 11, wherein the first magnitude is from 250 psig to 300 psig.

13. The method of claim 10, wherein the second magnitude is greater than 10 psig.

14. The method of claim 13, wherein the second magnitude is from 10 to 250 psig.

15. The method of claim 10, wherein the third magnitudes are individually adjusted respectively so that the velocities of the final extrudate exiting the outlet orifices are substantially the same.

16. The method of claim 10, wherein the final extrudate exiting each of the outlet orifices has a diameter of from 6 mm to 40 mm.

17. The method of claim 10, wherein the final extrudate exiting the outlet orifices is a food product.

18. The method of claim 17, wherein the final extrudate exiting the outlet orifices is aquatic feed.

* * * * *